United States Patent
Lo

(10) Patent No.: US 9,707,829 B2
(45) Date of Patent: Jul. 18, 2017

(54) PHOTOCHROMIC VEHICLE WINDOW

(71) Applicant: THUNDER POWER NEW ENERGY VEHICLE DEVELOPMENT COMPANY LIMITED, Central (HK)

(72) Inventor: Yu-An Lo, Taipei (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days.

(21) Appl. No.: 14/967,390

(22) Filed: Dec. 14, 2015

(65) Prior Publication Data

US 2017/0144514 A1    May 25, 2017

Related U.S. Application Data

(63) Continuation of application No. 14/951,466, filed on Nov. 24, 2015.

(51) Int. Cl.
| | | |
|---|---|---|
| *G02F 1/03* | (2006.01) |
| *G02F 1/07* | (2006.01) |
| *B60J 3/04* | (2006.01) |
| *G02B 5/23* | (2006.01) |
| *G02B 5/20* | (2006.01) |
| *G02B 1/02* | (2006.01) |

(52) U.S. Cl.
CPC ........ *B60J 3/04* (2013.01); *G02B 1/02* (2013.01); *G02B 5/208* (2013.01); *G02B 5/23* (2013.01)

(58) Field of Classification Search
CPC .......... B60J 3/04; G02F 2202/14; G02B 5/23; G02B 5/22
USPC ........................................... 359/241
See application file for complete search history.

(56) References Cited

U.S. PATENT DOCUMENTS

| | | | |
|---|---|---|---|
| 9,341,912 B2 * | 5/2016 | Shrivastava | G02F 1/153 |
| 2013/0014315 A1 * | 1/2013 | Valdez Diaz | A42B 3/226 2/424 |
| 2013/0278989 A1 * | 10/2013 | Lam | B60J 3/04 359/275 |

OTHER PUBLICATIONS

Non-Final Office Action mailed May 2, 2016, for U.S. Appl. No. 14/951,466, 9 pages.

* cited by examiner

*Primary Examiner* — Mahidere Sahle
(74) *Attorney, Agent, or Firm* — Kilpatrick Townsend & Stockton LLP

(57) ABSTRACT

The present disclosure describes various vehicle window assemblies including a photochromic window and a mounting assembly surrounding at least part of the window. The mounting assembly may be sized and configured for mounting to the cabin of a vehicle. The photochromic window may include a region configured to at least partially inhibit transmission of light in a visible, IR or UV frequency range upon exposure to a level of light.

19 Claims, 3 Drawing Sheets

PHOTOCHROMIC VEHICLE WINDOW

RELATED APPLICATION

The present application is a continuation of Non-Provisional U.S. application Ser. No. 14/951,466, filed Nov. 24, 2015, the disclosure of which is hereby incorporated by reference in its entirety for all purposes.

BACKGROUND

Exemplary embodiments of the present disclosure relate to vehicle windows, including windshields, door windows and/or roof windows, that may be installed, for example, in an electric vehicle.

Technology related to tinting vehicle windows typically involves selecting a desired tinting as measured by VLT (visible light transmission), and cutting and applying tint films with a corresponding VLT. However, such procedures are limited in their ability to provide a tint that is optimal for all driving conditions, such as day, night, overcast, raining, snowing, etc. Additionally, as the plastic tint films age over time, they may develop roughness on the surface, flake and/or peel.

Suboptimal window tinting can lead to various problems under different conditions, e.g. depending on whether there is too little, or too much tinting for the current conditions. For example, The absence of tinting (or too little tinting) can increase the risk of skin cancer from long-term exposure to light, cause eye damage due to high-intensity light exposure, and/or increase cabin temperatures to levels that damage, fade or otherwise accelerate the deterioration of the vehicle interior. Too much tinting can also affect the driver's ability to see at night or other relatively low-light conditions, and/or obstruct desired views through roof windows and the like.

SUMMARY

Exemplary embodiments of the present disclosure may address at least some of the above-noted problems. For example, according to first aspects of the disclosure, a vehicle window assembly may include one or more of a photochromic window, and a mounting assembly surrounding at least part of the window. In embodiments, the mounting assembly may be sized and configured for mounting to the cabin of a vehicle. In embodiments, the photochromic window may include a region configured to at least partially inhibit transmission of light in a frequency range upon exposure to a level of light.

In embodiments, the frequency range may include at least one of a visible spectrum of light, an infrared spectrum of light, or an ultraviolet spectrum of light.

In embodiments, the frequency range may be limited to a range including at least some visible spectra of light, for example 400 to 1071 THz, 400 to 800 THz, 667 to 1071 THz, 667 to 800 THz, etc.

In embodiments, the frequency range may include an infrared spectrum of light, for example 37 to 400 THz, 214 to 400 THz, 100 to 214 THz, 37-100 THz, and combinations thereof.

In embodiments, the frequency range may include an ultraviolet spectrum of light, for example 800 THz to 30 PHz.

In embodiments, inhibiting the transmission of the light may include at least one of absorption or reflection of the light.

In embodiments, inhibiting transmission of the light may include changing a transmittance of the light in the frequency range through the window from greater than 90% to at least one of less than 50%, less than 20%, less than 10%, or 5%. In embodiments, the transmittance of the window may vary between more than two levels and/or progressively from a maximum transmittance to a minimum transmittance.

In embodiments, the photochromic window may include microcrystalline silver halides and the level of light may include an intensity of ultraviolet light. In embodiments, the photochromic materials may include spiropyrans, spirooxazines, diarylethers, azobenzenes, photochromic quinones and/or inorganic photochromics.

In embodiments, the window assembly may be at least one of a windshield, a rear window, a door window, or a roof window.

In embodiments, the window assembly may be a roof window comprising over 25%, 50% or 75% of the surface area of a roof of the cabin.

In embodiments, the region may be smaller than the total surface area of the photochromic window.

According to further aspects of the invention, a vehicle cabin window may include one or more of a window pane sized and configured for mounting to a cabin of a vehicle, and a photochromic region configured to at least partially inhibit transmission of at least one of a visible spectrum of light, an infrared spectrum of light, or an ultraviolet spectrum of light upon exposure to a level of light.

In embodiments, the frequency range may be limited to a range including at least some visible spectra of light, for example 400 to 1071 THz, 400 to 800 THz, 667 to 1071 THz, 667 to 800 THz, etc.

In embodiments, the frequency range may be limited to or include an infrared spectrum of light, for example 37 to 400 THz, 214 to 400 THz, 100 to 214 THz, 37-100 THz, and combinations thereof.

In embodiments, the frequency range may be limited to or include an ultraviolet spectrum of light, for example 800 THz to 30 PHz.

In embodiments, inhibiting the transmission of the light may include at least one of absorption or reflection of the light.

In embodiments, the photochromic window may include microcrystalline silver halides and the level of light may include an intensity of ultraviolet light. In embodiments, the photochromic materials may include spiropyrans, spirooxazines, diarylethers, azobenzenes, photochromic quinones and/or inorganic photochromics.

In embodiments, the window may be a windshield, a door window, or a roof window.

In embodiments, the window may be a roof window comprising, for example, over 25%, 50% or 75% of the surface area of a roof of the cabin.

In embodiments, the level of light may include an intensity of ultraviolet light.

In embodiments, inhibiting transmission of the light may include changing a transmittance of the light in the frequency range through the window from greater than 90% to at least one of less than 50%, less than 20%, less than 10%, or 5%. In embodiments, the transmittance of the window may vary between more than two levels and/or progressively from a maximum transmittance to a minimum transmittance.

According to further aspects of the invention, a vehicle including one or more photochromic windows, as described herein, may be provided.

According to further aspects of the invention, methods of manufacturing a vehicle including one or more photochromic windows, as described herein, may be provided.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings.

DETAILED DESCRIPTION

Figure 1:
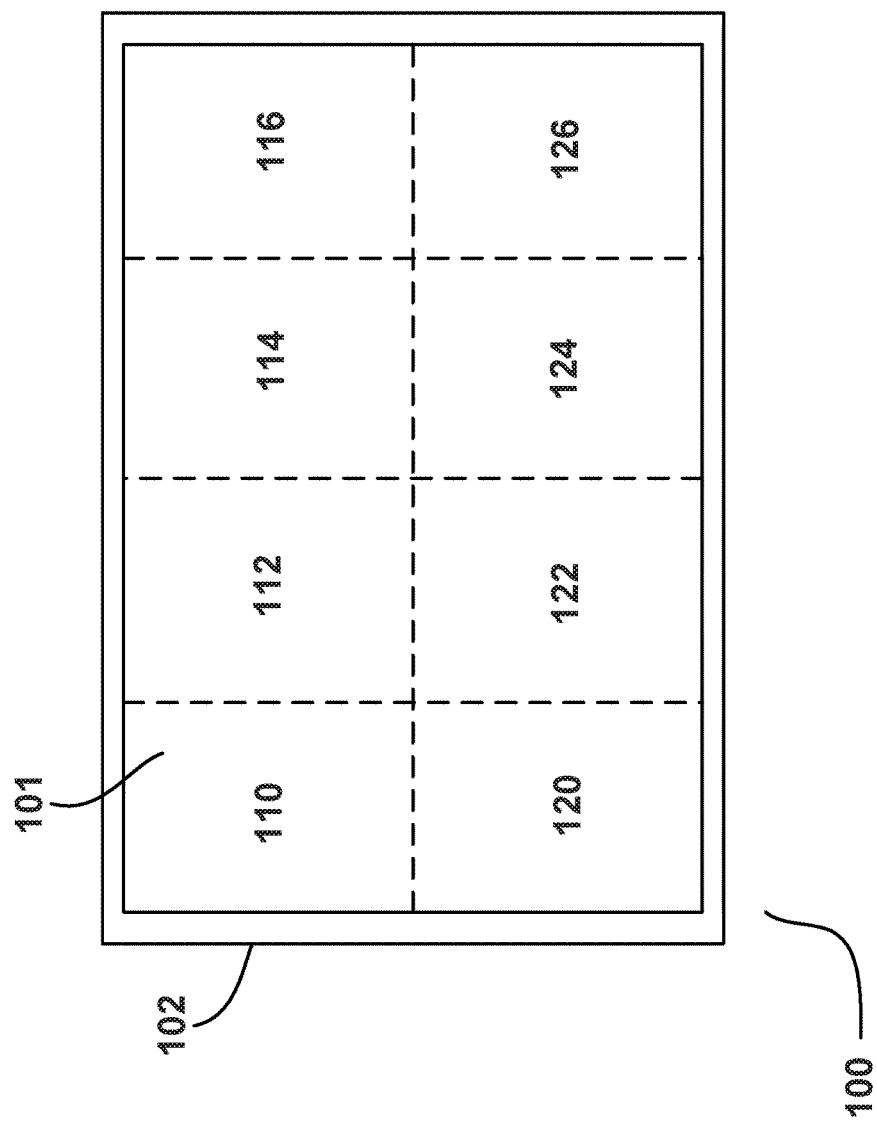
FIG. 1 is a schematic diagram of a window assembly, according to an exemplary embodiment of the present disclosure.

Various example embodiments of the present disclosure will be described below with reference to the drawings constituting a part of the description. It should be understood that, although terms representing directions are used in the present disclosure, such as "front", "rear", "upper", "lower", "left", "right", and the like, for describing various exemplary structural parts and elements of the present disclosure, these terms are used herein only for the purpose of convenience of explanation and are determined based on the exemplary orientations shown in the drawings. Since the embodiments disclosed by the present disclosure can be arranged according to different directions, these terms representing directions are merely used for illustration and should not be regarded as limiting. Wherever possible, the same or similar reference marks used in the present disclosure refer to the same components.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

FIG. 1 is shows a vehicle window assembly 100, according to an example embodiment of the present disclosure. As shown in FIG. 1, vehicle window assembly 100 includes a photochromic window 101, and a frame 102 surrounding the window 101. The frame may be part of, for example, a vehicle cabin, a vehicle door, a vehicle roof, a windshield frame, a rear window frame, a door frame, a roof window frame, etc. In some examples, the frame 102 may be sized and configured for mounting to the cabin of a vehicle.

The photochromic window may include one or more regions (e.g. 110-116 and 120-126) configured to at least partially inhibit transmission of light in a frequency range upon exposure to a level of light. The number, shape and size of the various regions 110-116 and 120-126 depicted in FIG. 1 are merely exemplary. Various other numbers, shapes and sizes are also contemplated within the scope of the invention. In some examples the window 101 may include a uniform photochromic region over the entire window, or one or more of regions 110-116 and/or 120-126 may include different photochromicity. For example, for a windshield, rear window and/or door window, the upper regions 110-116 may have a higher photochromicity than that of lower regions 120-126.

In embodiments, the window 101 may be configured to inhibit transmission of light in a given frequency range by changing a transmittance through the window 101 (or designated regions of the window 101) from greater than 90% to at least one of less than 50%, less than 20%, less than 10%, or 5%. In embodiments, the transmittance of the window 101 (or one or more regions 110-116 and/or 120-126) may vary between more than two levels and/or progressively from a maximum transmittance to a minimum transmittance.

In some examples, the photochromicity of window 101 may also vary in a linear or non-linear manner within one or more regions 110-116 and/or 120-126, from top to bottom and/or left to right.

In embodiments, the frequency range of the light inhibited by the one or more of regions 110-116 and/or 120-126 may be limited to a range including at least some visible spectra of light, for example 400 to 1071 THz, 400 to 800 THz, 667 to 1071 THz, 667 to 800 THz, etc. Inhibiting light in this range may be beneficial, for example, to improve visibility in intense light and/or glare situations, reduce cabin heating, protect occupants' eyes and/or skin, and/or protect the vehicle interior.

In embodiments, the frequency range of the light inhibited by the one or more of regions 110-116 and/or 120-126 may be limited to or include an infrared spectrum of light, for example 37 to 400 THz, 214 to 400 THz, 100 to 214 THz, 37-100 THz, and combinations thereof. Inhibiting light in this range may be beneficial, for example, to reduce cabin heating, and/or protect occupants' eyes (e.g. the lens and the cornea) and/or skin (e.g. from harmful combinations of UV, visible light, and infrared).

In embodiments, the frequency range of the light inhibited by the one or more of regions 110-116 and/or 120-126 may be limited to or include an ultraviolet spectrum of light, for example 800 THz to 30 PHz. Inhibiting light in this range may be beneficial, for example, to improve visibility in intense light and/or glare situations, protect occupants' eyes and/or skin from photokeratitis, and/or protect the vehicle interior from UV degradation including discoloration, fading, cracking, loss of strength or disintegration.

In embodiments, inhibiting the transmission of the light may include at least one of absorption or reflection of the light, depending, for example, on the type of photochromic material used. Possible photochromic materials that may be used include spiropyrans, spirooxazines, diarylethers, azobenzenes, photochromic quinones and/or inorganic photochromics. In some embodiments, the photochromic window may include microcrystalline silver halides, tailored to respond to a level of ultraviolet light.

In embodiments, the window assembly 100 may be a roof window comprising over 25%, 50% or 75% of the surface area of a roof of the cabin. In such cases, the regions 110-116 and/or 120-126 may have uniform photochromicity or the photochromicity may vary, for example, from left to right as shown in FIG. 1 (e.g. from the front to the back of vehicle).

Figure 2:
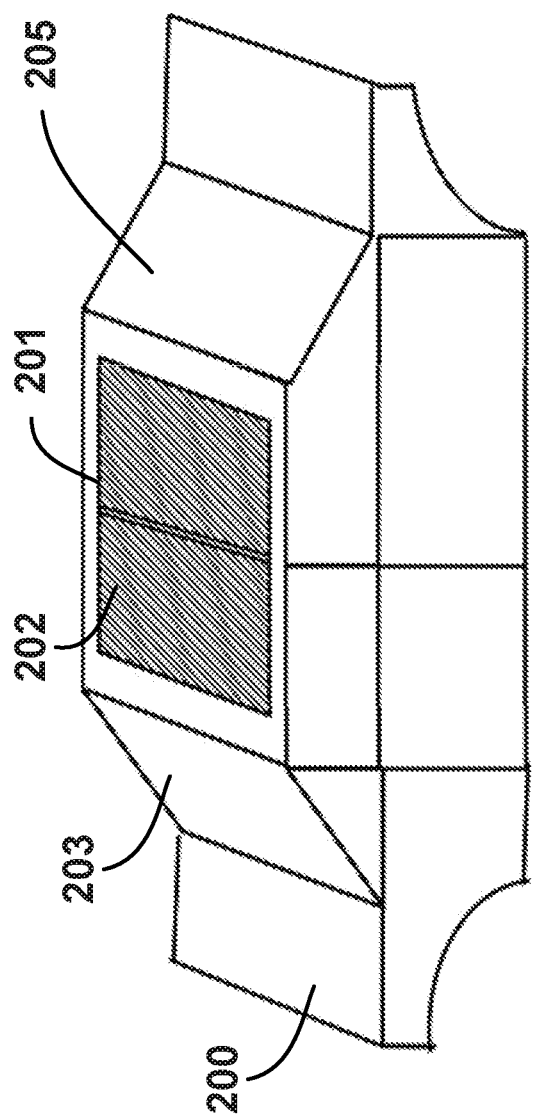
FIG. 2 is a partial schematic diagram of a vehicle including a panoramic window, according to an exemplary embodiment of the present disclosure.

Further details of an exemplary roof window (i.e. a moonroof) are shown in FIG. 2. As shown in FIG. 2, a vehicle 200 may include a window assembly 201 including one or more photochromic windows 202. Preferably, the roof windows 202 comprise over 75% of the surface area of a roof of the vehicle cabin. The one or more windows 202 may include various photochromic regions, as described above for window 101. For example, the window 202 may be configured to change a transmittance through the window 202 (or designated regions of the window 202) from greater than 90% to at least one of less than 50%, less than 20%, less than 10%, or 5%. In other examples, the window 202 (or regions of the window 202) may include a permanent tint so that the window and/or regions change a transmittance from an in initial transmittance in a range between 90% to 50%, to at least one of less than 50%, less than 20%, less than 10%, or 5% (or progressively from a maximum transmittance to a minimum transmittance in those ranges).

Figure 3:
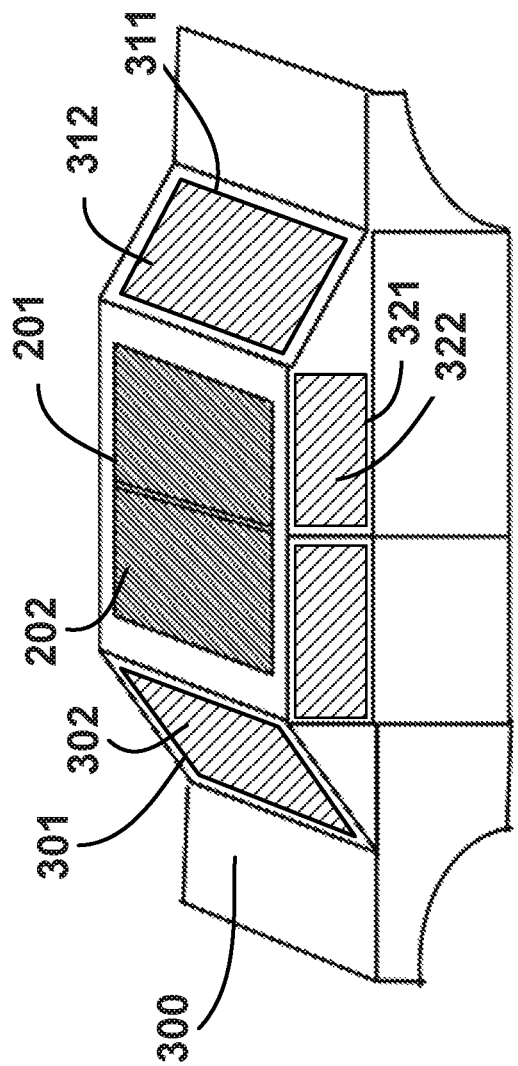
FIG. 3 is a partial schematic diagram of a vehicle including cabin windows, according to an exemplary embodiment of the present disclosure.

Further details of a vehicle including an exemplary roof window assembly 201 (as shown in FIG. 2), along with additional photochromic windows, are shown in FIG. 3. As shown in FIG. 3, a vehicle 300 may include a window assembly 201 including one or more photochromic windows 202. The window assembly 201 and one or more photochromic windows 202 may be configured as described above. The vehicle 300 may also include one or more of photochromic windshield assembly 301, photochromic rear window assembly 311, and/or photochromic door window assembly 321.

The photochromic windshield assembly 301 may include one or more photochromic windows 302. The one or more windows 302 may include various photochromic regions, as described above for window 101. For example, the window 302 may be configured to change a transmittance through the window 302 (or designated regions of the window 302) from greater than 90% to at least one of less than 50%, less than 20%, less than 10%, or 5%. Preferably, one or more upper regions in window 302 have higher degrees of photochromicity than the lower region(s) of the window. For example, upper region(s) may be configured to change a transmittance from greater than 90% to less than 20%, or less than 10% (or progressively from a maximum transmittance to a minimum transmittance in those ranges), and the lower region(s) may be configured to change a transmittance from greater than 90% to less than 90%, or less than 50%, (or progressively from a maximum transmittance to a minimum transmittance in those ranges). In other examples, upper region(s) of the window 302 may include a permanent tint so that, even with a uniform photochromic inhibition, changes in transmittance of the upper region(s) are within a lower range than the rest of the windshield. For example, if the upper region(s) have a permanent tint that results in a transmittance of 90% absent any photochromic changes, the upper region may vary between a maximum transmittance of 90% and a minimum transmittance of 40% (assuming a maximum photochromic inhibition of 50%), whereas the other region(s) may vary between a maximum transmittance of 100% and a minimum transmittance of 50% (assuming the same maximum photochromic inhibition of 50%). Other values and configurations are also possible.

The photochromic rear window assembly 311 may include one or more photochromic windows 312. The one or more windows 312 may include various photochromic regions, as described above for window 101. For example, the window 312 may be configured to change a transmittance through the window 312 (or designated regions of the window 312) from greater than 90% to at least one of less than 50%, less than 20%, less than 10%, or 5%. Preferably, one or more upper regions in window 312 have higher degrees of photochromicity than the lower region(s) of the window. For example, upper region(s) may be configured to change a transmittance from greater than 90% to less than 20%, or less than 10% (or progressively from a maximum transmittance to a minimum transmittance in those ranges), and the lower region(s) may be configured to change a transmittance from greater than 90% to less than 90%, or less than 50%, (or progressively from a maximum transmittance to a minimum transmittance in those ranges). In other examples, one or more regions of the window 312 may include a permanent tint so that, even with a uniform photochromic inhibition, changes in transmittance of the one or more regions are within a lower range than the rest of the windshield. For example, if the one or more regions have a permanent tint that results in a transmittance of 80% absent any photochromic changes, the upper region may vary between a maximum transmittance of 80% and a minimum transmittance of 20% (assuming a maximum photochromic inhibition of 60%), whereas the other region(s) may vary between a maximum transmittance of 100% and a minimum transmittance of 40% (assuming the same maximum photochromic inhibition of 60%). Other values and configurations are also possible.

The photochromic door window assembly 321 may include one or more photochromic windows 322. The one or more windows 322 may include various photochromic regions, as described above for window 101. For example, the window 322 may be configured to change a transmittance through the window 322 (or designated regions of the window 322) from greater than 90% to at least one of less than 50%, less than 20%, less than 10%, or 5%. Preferably, one or more regions in window 322 have higher degrees of photochromicity than other region(s) of the window. For example, one region may be configured to change a transmittance from greater than 90% to less than 20%, or less than 10% (or progressively from a maximum transmittance to a minimum transmittance in those ranges), and other region(s) may be configured to change a transmittance from greater than 90% to less than 90%, or less than 50%, (or progressively from a maximum transmittance to a minimum transmittance in those ranges). In other examples, one or more regions of the window 322 may include a permanent tint so that, even with a uniform photochromic inhibition, changes in transmittance of the one or more regions are within a lower range than the rest of the windshield. For example, if the one or more regions have a permanent tint that results in a transmittance of 70% absent any photochromic changes, the upper region may vary between a maximum transmittance of 70% and a minimum transmittance of 10% (assuming a maximum photochromic inhibition of 60%), whereas the other region(s) may vary between a maximum transmittance of 100% and a minimum transmittance of 40% (assuming the same maximum photochromic inhibition of 60%). Other values and configurations are also possible.

According to further aspects of the invention, a vehicle including one or more photochromic windows, such as vehicle 200 and/or 300, may be provided. In some examples, such vehicles may be assembled by the vehicle manufacturer including one or more of the windows described herein. In other examples, vehicles may be refitted with such windows.

According to further aspects of the invention, methods of manufacturing a vehicle including one or more photochromic windows, as described herein, may be provided. Such methods may generally follow conventional vehicle assembly procedures, which are not discussed herein, but may further include the installation of photochromic windows in one or more window frames of the vehicle cabin, e.g. windshield, rear window, door window and/or roof window.

Although the present disclosure has been described with reference to the specific embodiments shown in the drawings, it should be understood that the lightweight fastening methods provided by the present disclosure can have a variety of variations without departing from the spirit, scope and background of the present disclosure. The description given above is merely illustrative and is not meant to be an exhaustive list of all possible embodiments, applications or modifications of the invention. Those of ordinary skill in the art should be still aware that, parameters in the embodiments disclosed by the present disclosure can be changed in different manners, and these changes shall fall within the spirit and scope of the present disclosure and the claims. Thus, various modifications and variations of the described methods and systems of the invention will be apparent to those skilled in the art without departing from the scope and spirit of the invention.

What is claimed is:

1. A windshield assembly, comprising:
multiple photochromic windows; and
wherein at least one of the photochromic windows includes a first photochromic region configured to progressively change transmission of a light in a frequency range by a first range of percentages, a second photochromic region configured to progressively change transmission of the light in the frequency range by a second range of percentages, wherein the first range of percentages is smaller than the second range of percentages, and at least one photochromic region displaced between the first and second photochromic regions, the at least one photochromic region being configured to change transmission of the light in the frequency region by a percentage greater than the first percentage but smaller than the second percentage.

2. The windshield assembly of claim 1, wherein the frequency range includes at least one of a visible spectrum of light, an infrared spectrum of light, or an ultraviolet spectrum of light.

3. The windshield assembly of claim 1, wherein the frequency range includes a visible spectrum of light.

4. The windshield assembly of claim 1, wherein the frequency range includes an infrared spectrum of light.

5. The windshield assembly of claim 1, wherein the frequency range includes an ultraviolet spectrum of light.

6. The windshield assembly of claim 1, wherein the at least one photochromic window is at least one of a windshield, a rear window, a door window, or a roof window.

7. The windshield assembly of claim 1, wherein the at least one photochromic window is a roof window comprising over 75% of the surface area of a roof of the cabin.

8. The windshield assembly of claim 1, wherein changing the transmission of the light includes at least one of absorption or reflection of the light.

9. The windshield assembly of claim 1, wherein the at least one photochromic window includes microcrystalline silver halides and the level of light includes an intensity of ultraviolet light.

10. The windshield assembly of claim 1, wherein the first photochromic region is smaller than the total surface area of the photochromic window.

11. A vehicle rear window assembly, comprising:
multiple photochromic window regions; and
wherein at least one of photochromic regions includes a first photochromic region configured to progressively change transmission of a light in a frequency range by a first range of percentages, a second photochromic region configured to progressively change transmission of the light in the frequency range by a second range of percentages, wherein the first range of percentages is smaller than the second range of percentages, and at least one photochromic region displaced between the first and second photochromic regions, the at least one photochromic region being configured to change transmission of the light in the frequency region by a percentage greater than the first percentage but smaller than the second percentage.

12. The vehicle rear window assembly of claim 11, wherein the frequency range includes a visible spectrum of light.

13. The vehicle rear window assembly of claim 11, wherein the frequency range includes an infrared spectrum of light.

14. The vehicle rear window assembly of claim 11, wherein the frequency range includes an ultraviolet spectrum of light.

15. The vehicle rear window assembly of claim 11, wherein the at least one at least one of a windshield, a door window, or a roof window.

16. The vehicle rear window assembly of claim 11, wherein the window is a roof window comprising over 75% of the surface area of a roof of the cabin.

17. The vehicle rear window assembly of claim 11, wherein changing the transmission of the light includes at least one of absorption or reflection of the light.

18. The vehicle rear window assembly of claim 11, wherein the level of light includes an intensity of ultraviolet light.

19. The vehicle rear window assembly of claim 11, wherein changing transmission of the light by the first percentage includes changing a transmittance of the light in the frequency range through the window from greater than 90% to less than 50%.

* * * * *